Sept. 16, 1958 T. D. SEILEY 2,852,274
SPRING HITCH TOW BAR FOR TRAILERS
Filed Feb. 10, 1956
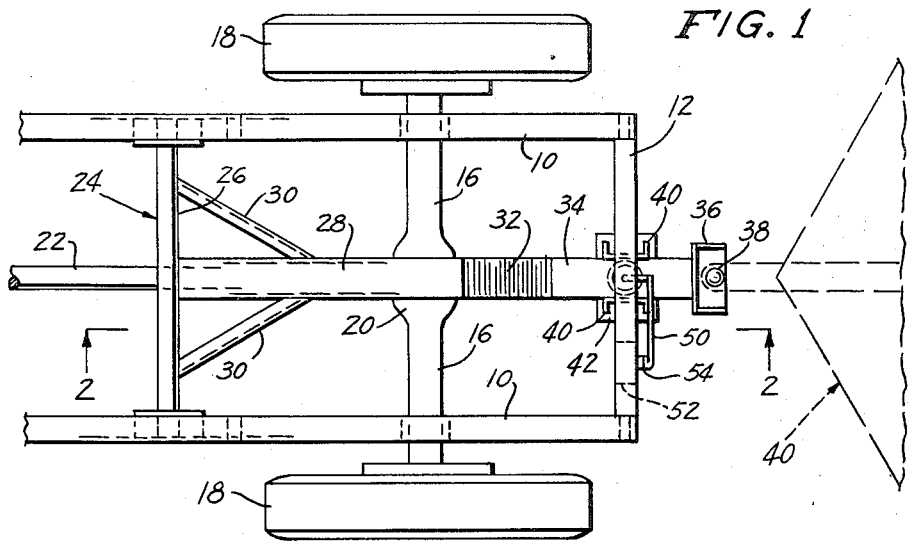
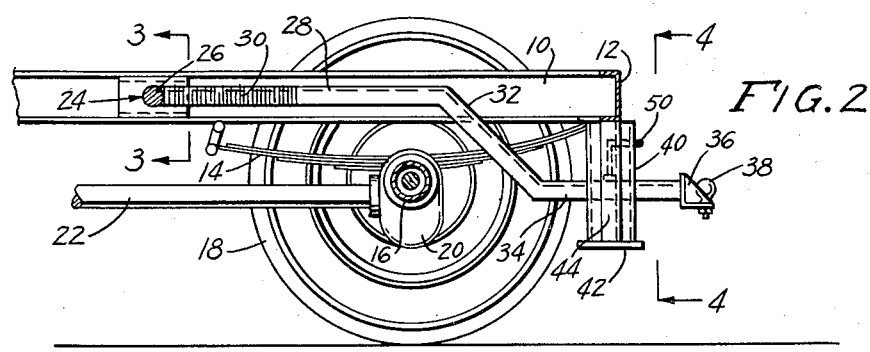
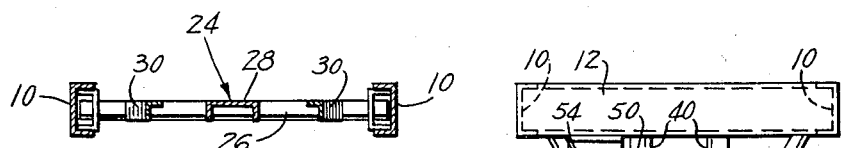
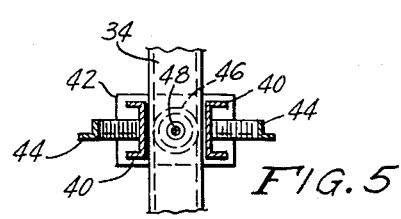
INVENTOR.
THURMON D. SEILEY
BY
McMorrow, Berman & Davidson
ATTORNEYS

United States Patent Office 2,852,274
Patented Sept. 16, 1958

2,852,274

SPRING HITCH TOW BAR FOR TRAILERS

Thurmon Dale Seiley, Newark, Del.

Application February 10, 1956, Serial No. 564,712

2 Claims. (Cl. 280—489)

This invention relates to trailer hitches, and more particularly has reference to a device of this type that will provide a particularly strong connection of the trailer to the traction vehicle, and will at the same time permit up-and-down movement of the coupling between the traction and trailing vehicles.

One important object is to provide a hitch as stated particularly designed to permit the pulling of heavy trailers, such as house trailers, etc.

Another object is to so form the hitch as to require no modification or redesign of the hitch of the trailing vehicle.

Another object is to permit the trailing vehicle to be coupled and uncoupled with the same ease and speed as is found in conventional hitches not having the advantages of the present invention.

Still another object is to mount the tow bar pivotally upon the frame of the towing vehicle, well in advance of the rear axle of said towing vehicle, with tow bar swingable vertically in a path that will not interfere in any way with normal operation of the towing or traction vehicle.

Still another object is to provide a resilient support for the free end portion of the tow bar, comprising a novel combination of an interacting spring and shock absorber means, designed to effectively cushion the tow bar against road shocks encountered during operation of the towing vehicle, during both the upward and downward movement of the two bar.

Other objects will appear form the following description, the claims appended thereto, and from the annexed drawing, in which like reference characters designate like parts throughout the several views, and wherein:

Figure 1 is a fragmentary top plan view of the frame of a towing vehicle, showing the invention in top plan, a traction vehicle being illustrated fragmentarily and in dotted outline;

Figure 2 is a longitudinal sectional view on line 2—2 of Figure 1;

Figure 3 is a transverse section on line 3—3 of Figure 2;

Figure 4 is a transverse section on line 4—4 of Figure 2; and

Figure 5 is a horizontal section on line 5—5 of Figure 4.

Referring to the drawings in detail, designated at 10 are side frame members of a towing vehicle, connected at their rear ends by a transverse frame member or cross bar 12. Connected by springs 14 to the side frame members is an axle housing 16, on the outer ends of which rear wheels 18 are rotatably mounted. A differential 20 is provided intermediate opposite ends of the axle housing and projecting forwardly from the differential is the drive shaft 22. All this is conventional construction and does not per se constitute part of the present invention.

The device constituting the present invention has been generally designated at 24, and includes a rock shaft 26 extending transversely between members 10 at location spaced forwardly a substantial distance from the axle housing. The rock shaft is journalled in bearings secured to the side frame members, and rigid with and extending rearwardly from the rock shaft is an elongated, channeled draw bar 28. Brace bars 30 extend between the draw bar and rock shaft to reinforce the connection therebetween.

The draw bar extends longitudinally and centrally of the vehicle frame above the axle housing, and has a straight forward end portion merging at its rear end into an inclined part 32 which is inclined downwardly rearwardly from the forward end portion of the draw bar. The inclined part merges at its rear end into a rear end portion 34 parallel to the forward end portion and secured fixedly to portion 34 is a bracket 36 on which is mounted an upwardly projecting ball element 38 adapted to receive the downwardly opening ball socket of the hitch device of a trailer generally designated at 39. The draw bar, thus, swings upwardly and downwardly in a vertical plane, with the rear end portion being guided in its vertical movement between short, vertically disposed, channelled guide bars 40, fixedly secured at their upper ends to the cross bar 12 of the vehicle frame. The bars 40, at their lower ends, are fixedly connected to a bottom end plate 42, and bracing the guide defined by bars 40 and plate 42 are upwardly diverging channels 44 fixedly connected between the lower ends of bars 40 and the end portions of cross bars 12.

A coiled compression spring 46 seats upon plate 42 between the bars 40, with the rear end portion 34 of the draw bar resting upon the spring. Thus, the spring yieldably, resiliently resists downward movement of the draw bar, and in its fully expanded position supports the draw bar in a normal position shown in Figure 2, in which position the forward and rear end portions of the draw bar are horizontally disposed.

A shock absorber means is provided to cushion in a resilient manner the upward movement of the draw bar and includes a vertical stem 48 disposed axially of the spring 46 and having a fixed connection at its lower end to the draw bar portion 34. At its upper end, stem 48 has a pivotal connection to one end of an arm 50 extending transversely of and above the draw bar. Arm 50, at the end thereof remote from the stem, has an extension 54 which projects into the housing 52 of a conventional shock absorber, said housing being secured to the underside of cross bar 12 at one side of the guide means hereinbefore described.

The shock absorber is attached to exert its cushioning action whenever the draw bar tends to swing upwardly during use, and cooperates with the spring in resiliently, yieldably supporting the draw bar against movement both in an up-and-down direction.

It has been found that in use, a tow bar of the type illustrated and described has especially high strength, and operates with complete efficiency under both good and bad driving conditions. In every instance, the pull of the trailer rearwardly upon the traction vehicle is transmitted to the side of the vehicle frame well in advance of the axle housing, resulting in a minimum amount of strain upon the towing vehicle and further insuring to the maximum extent the normal operation of the towing vehicle. Further, another important characteristic of the invention resides in the fact that the trailing vehicle can be hitched or unhitched in the same manner as conventional devices not having the characteristics of the present invention, the construction being such as to permit use of the device with conventional trailer hitches already in existence.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. The combination, with a vehicle frame including side frame members and a cross bar connected transversely between the side members, of a trailer hitch comprising: a draw bar extending longitudinally of the frame between the side frame members and having a rear end terminating rearwardly of the rear frame member, said draw bar having a forward end portion pivotally connected to the side frame members on a horizontal transverse axis extending between the side frame members, the draw bar being formed with a rear end portion offset downwardly from the rear frame member; means on the rear end portion of the draw bar for connecting a trailing vehicle thereto; a vertically depending guide means on the rear frame member guiding the rear end portion in its up and down swinging movement about said transverse axis; and resilient, yielding means above and below the rear end portion in said guide means tensioned to cushionably, yieldably resist up and down movements of the rear end portion, the means above the rear end portion comprising a shock absorber including a housing fixedly secured to the under side of said cross bar laterally of the draw bar, an arm pivoted in the housing on a horizontal axis extending normally to the transverse axis, said arm being cushionably, yieldably restrained against upward movement about its axis, and a stem extending upwardly from the draw bar and pivotally connected to the arm, the means below the draw bar comprising a vertically extending, compression coil spring interposed between the draw bar and the lower end of the guide means in substantially coaxial alignment with the stem.

2. The combination, with a vehicle frame including side frame members and a cross bar connected transversely between the side members, of a trailer hitch comprising: a draw bar extending longitudinally of the frame between the side frame members and having a rear end terminating rearwardly of the rear frame member, said draw bar having a forward end portion pivotally connected to the side frame members on a horizontal transverse axis extending between the side frame members, the draw bar being formed with a rear end portion offset downwardly from the rear frame member; means on the rear end portion of the draw bar for connecting a trailing vehicle thereto; a vertically depending guide means on the rear frame member guiding the rear end portion in its up and down swinging movement about said transverse axis; and resilient, yielding means above and below the rear end portion in said guide means tensioned to cushionably, yieldably resist up and down movements of the rear end portion, the means above the rear end portion comprising a shock absorber including a housing fixedly secured to the under side of said cross bar laterally of the draw bar, an arm pivoted in the housing on a horizontal axis extending normally to the transverse axis, said arm being cushionably, yieldably restrained against upward movement about its axis, and a stem extending upwardly from the draw bar and pivotally connected to the arm, the means below the draw bar comprising a vertically extending, compression coil spring interposed between the draw bar and the lower end of the guide means in substantially coaxial alignment with the stem, the draw bar being formed as a downwardly opening channel the side walls of which embrace the upper end of the spring to provide a seat therefor and the web of which has a fixed connection to said stem.

References Cited in the file of this patent

UNITED STATES PATENTS

| | | |
|---|---|---|
| 1,840,435 | Davis | Jan. 12, 1932 |
| 2,097,445 | Christman | Nov. 2, 1937 |
| 2,150,269 | Dreisbach | Mar. 14, 1939 |
| 2,471,636 | Martin | May 31, 1949 |
| 2,484,889 | Hutton et al. | Oct. 18, 1949 |